United States Patent [19]
Laborie

[11] Patent Number: 6,003,124
[45] Date of Patent: *Dec. 14, 1999

[54] ELECTRONIC CIRCUIT AND METHOD FOR TIME SAVING USE OF A COPROCESSOR

[75] Inventor: Jean-Louis Laborie, St Egreve, France

[73] Assignee: SGS-Thomas Microelectronics S.A., Saint Genis, France

[ * ] Notice: This patent issued on a continued prosecution application filed under 37 CFR 1.53(d), and is subject to the twenty year patent term provisions of 35 U.S.C. 154(a)(2).

[21] Appl. No.: 08/436,769

[22] Filed: May 8, 1995

[30] Foreign Application Priority Data

May 10, 1994 [FR] France .................................. 94 05763

[51] Int. Cl.⁶ .................................................... G06F 9/30
[52] U.S. Cl. ............................ 712/34; 712/212; 709/400
[58] Field of Search .............................. 710/212, 34, 110;
709/400; 712/210, 28, 29, 30, 31, 32, 34, 212, 245; 713/400, 401

[56] References Cited

U.S. PATENT DOCUMENTS

| | | | |
|---|---|---|---|
| 4,715,013 | 12/1987 | MacGregor et al. | 395/379 |
| 4,862,407 | 8/1989 | Fette et al. | 395/800.35 |
| 4,894,768 | 1/1990 | Iwasaki et al. | 395/800.34 |
| 4,942,519 | 7/1990 | Nakayama | 395/290 |
| 4,949,241 | 8/1990 | Iwasaki et al. | 395/290 |
| 5,093,908 | 3/1992 | Beacom et al. | 395/376 |
| 5,119,499 | 6/1992 | Tonomura et al. | 395/800.34 |
| 5,420,989 | 5/1995 | Maher, III et al. | 395/290 |

OTHER PUBLICATIONS

Hewlett–Packard Journal 43, Aug. 1992, No. 4, Palo Alto, CA, US, pp. 12–22, Craig A. Gleason, et al. "VLSI Circuits For Low–End and Midrange PA–RISC Computers".

Electronic Design 2, Jan. 18, 1980, pp. 33–34, "Z8000 CPUs Expand Processing Power With New Instructions, Special Processors".

French Search Report cited in French application serial No. 94 05763, filed May, 10, 1994.

"The MC68020 32 –Bit MPU: Opening New Application Doors". Bob Beims, 8080 Wescon Proceedings San Francisco, CA, Nov. 19–22, 1985, pp. 1–17.

"The 68040 32–b Monolithic Processor", Anderson et al., 8107 IEEE Journal of Solid–State Circuits Oct. 25, 1990, No. 5, New York, US pp. 1178–1188.

"IBM Technical Disclosure Bulletin", vol. 33, No. 10B, Mar. 1991 —PROCOP —Programmable Coprocessor, pp. 8–11.

*Primary Examiner*—Viet D. Vu
*Attorney, Agent, or Firm*—Wolf, Greenfield & Sacks, P.C.

[57] ABSTRACT

A processor and coprocessor architecture wherein the coprocessor is put into operation at a cycle immediately following the decoding of an instruction code by the recognition, during this decoding, of the fact that this instruction is an instruction that has to be carried out by the coprocessor. The complementary decoding of the instructions makes it possible to lose no time in the configuration of the coprocessor. This type of architecture is particularly useful for digital processors entrusted with carrying out certain specific operations, notably audio processing operations.

62 Claims, 2 Drawing Sheets

FIG. 1

ELECTRONIC CIRCUIT AND METHOD FOR TIME SAVING USE OF A COPROCESSOR

BACKGROUND OF THE INVENTION

1. Field of the Invention

An object of the present invention is an electronic circuit, notably an integrated circuit as well as a particular use of this circuit by which a processor can be made to work with a coprocessor. It is more particularly promising in the field of digital signal processors (known as DSPs), one of whose essential features is their processing speed. Digital processors such as these are notably used in transmission to carry out encoding or encryption operations, notably in modems or for audio processing operations.

2. Discussion of the Related Art

There are known digital processors. These comprise a set of circuits that can be used to program a programmable processing circuit, in order to modify data elements as a function of the programmed state of the programming circuit. The modification of the programmed state of the programming circuit is obtained by the application, to this circuit, of digital signals known as instructions. The different circuits of a processor notably comprise instruction registers and data registers in order to set up links with the programmable processing circuit, as well as a sequencer that carries out an organization, in time, of the succession of the application of the different instructions and of the different data elements to the processing circuit. This succession of operations is called a program. Normally, a processor such as this is capable of carrying out any type of operation provided that appropriate instructions are applied to it.

However, a problem arises when certain specific processing operations that are particularly complicated and lengthy have to be carried out speedily. In this case, it is not possible to have recourse to a normally used type of processor: if such a processor is used, the execution of the subsequent instructions will be delayed for an excessively lengthy period related to the complexity of these specific processing operations. For example, it may be assumed that the work of a processor has to be paced at a given rate, each operation lasting one cycle period. It is possible to be faced, during this work, with an operation whose duration is for example fifty times the cycle period.

To carry out, all the same, a lengthier operation of this kind during one cycle or at least at high speed, the technique of coprocessors has been resorted to. Coprocessors are, in practice, specific circuits that are capable of high-speed performance (for example performance within three or four cycles) of operations that would have taken fifty cycles with the normal processor. Putting a coprocessor into operation at the right time nevertheless requires that the processor should configure the coprocessor and hand over the responsibility to this coprocessor by sending it the required data elements. The coprocessor then starts working independently and, as soon as it has finished its work, it informs the processor that the processed data elements are available.

A mode of operation such as this cannot however be envisaged when the operations to be carried out in a single cycle period are not excessively lengthy, for example when they take only five cycle periods. Indeed, if the configuration of the coprocessor requires a duration of five cycles and is then made to perform the work during one cycle, then nothing is gained as compared with what would have been obtained by causing the work to be carried out directly by the processor, which is essentially a slow device.

SUMMARY OF THE INVENTION

It will be shown that the invention, although it is also useful when the coprocessor has to carry out operations that are excessively lengthy and complicated, is more particularly useful for resolving problems of reducing the duration for which the coprocessor is put into operation.

Furthermore, the invention is also particularly promising when, after a preliminary definition of the generation circuits of a processor, it is sought, on one and the same electronic integrated circuit, to carry out complementary functions. In this case, it will be possible to redesign an integrated circuit entirely since, in practice, a coprocessor is a specific circuit dedicated to the processing of certain little-used operations that are known and complicated. However, the preparing of a new integrated circuit for each different need is an operation that is excessively complex if it implies calling the entire circuit into question.

With the system of the invention, it is possible to keep the core of the circuit so that it is always identical: the processor is always kept. By contrast, for certain specific operations that have to be carried out at particularly high speed, a specific coprocessor is made on one and the same integrated circuit. The mode of exchange, proposed by the invention, between the processor and the coprocessors, is then particularly-favorable to a modification of this kind. The coprocessor preferably includes circuits to process data elements according to instructions that are also transmitted to it.

The particular feature of the invention is that commands delivered by a sequence of the processor are used to guide the coprocessor. Furthermore, the processor and the coprocessor are connected to the same output bus of a data memory and, at the same time, receive the instructions read in this data memory. Both have an instruction decoder. According to the invention, the instruction decoder of the processor has circuits to recognize that an instruction has to be carried out by the coprocessor and to produce a corresponding recognition signal. This recognition signal is then sent to the coprocessor to validate its operation. Since, in the invention, the processor and the coprocessor are both in parallel, the decoding of the instruction by the coprocessor, which is done at the same time as the decoding of the instruction by the processor, is validated so that the coprocessor can carry out the instruction. Preferably, the performance of the instruction takes place in a cycle following its decoding and the coprocessor is capable of carrying out all the instructions that its decoder has decoded validly.

In the invention, the working time of the assisting coprocessor is preferably limited to one cycle of the working time of the main processor. However, it is possible to activate the coprocessor several times in succession at the initiative of the processor.

The principle of decoding chosen in the invention to implement the coprocessor is particularly flexible and well suited to an almost parallel operation of the processor and the coprocessor. Furthermore, in order to simplify the making of the coprocessor, it is planned that all the operations for the transfer of data elements from a data memory to the coprocessor will be done at the initiative of the processor. Thus, for an instruction that has to be carried out by the coprocessor, the processor is entrusted with giving the coprocessor, at the start of the processing operation, data elements to be processed and with taking the processed data elements at the end of the processing operation.

An object of the invention therefore is an electronic circuit comprising a processor and a coprocessor, in which the processor and the coprocessor are connected to one and the same memory of instructions by at least certain wires of a data output bus of the instructions memory. The processor comprises, in an instruction decoder, a circuit for the recognition, in an instruction transmitted by the bus, of the fact that this instruction has to be carried out, at least partially, by the coprocessor and for the sending, to the coprocessor, of a corresponding recognition signal. The coprocessor also comprises a validation circuit to permit it to carry out an instruction when it receives the recognition signal.

Another object of the invention is a method for the use of a processor and a coprocessor. In this method, at least one same part of an instruction is sent simultaneously to the processor and the coprocessor by at least certain wires of an output bus of a memory of instructions. The instruction is decoded in the processor and a recognition signal is produced therein corresponding to the fact that a decoded instruction has to be carried out by the coprocessor. And the coprocessor is allowed to carry out an instruction when it receives this recognition signal.

BRIEF DESCRIPTION OF THE DRAWINGS

The invention will be understood more clearly from the following description and from the appended diagrams which are given purely by a way of an indication and in no way restrict the scope of the invention. Of these figures.

DETAILED DESCRIPTION

Figure 1:
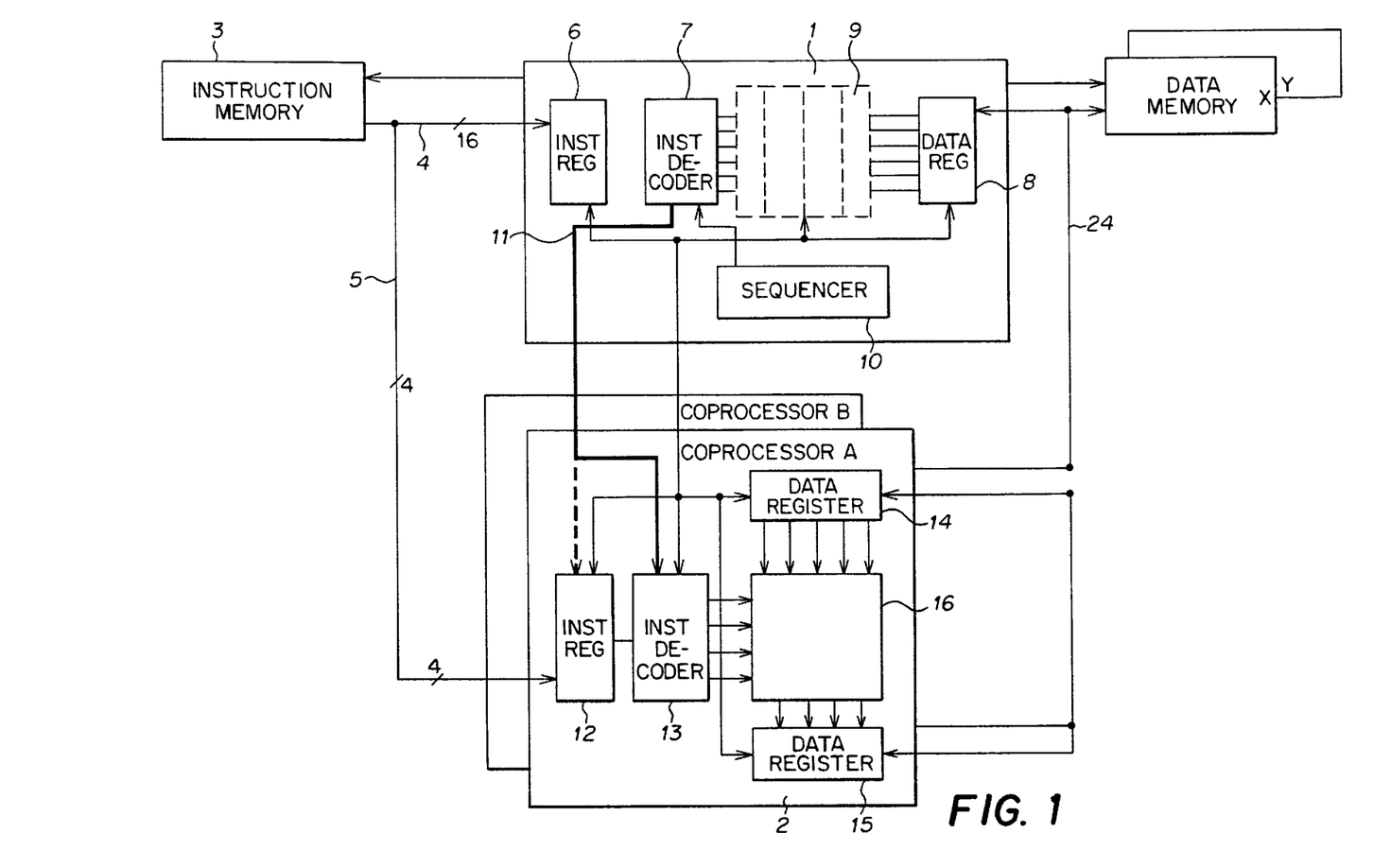
FIG. 1 shows an electronic circuit according to the invention.

FIG. 1 shows an electronic circuit according to the invention. This electronic circuit has a processor 1 and a coprocessor 2. The processor 1 is, for example, a processor designed to carry out all the common functions of a modem for the transmission of digital data, notably the functions of bit control, synchronization with frames imposed from the exterior as well as, possibly, certain operations for the compression of data elements to be transmitted. In one example, the coprocessor is designed to implement a known VITERBI type of convolution and equalization algorithm. This coprocessor must, naturally, work in real time at the rate of the arrival and departure of the data elements in order to transmit them without any delay. Given the complexity of the operations to be implemented in a VITERBI algorithm such as this, it has not been possible to envisage their being carried out by the processor 1 unless this processor 1 is designed to have circuits that are ultra-fast (hence circuits that are difficult to make and expensive) or specialized for this function (hence circuits that require efforts of redefinition and designing that are excessively great since ultimately they only associate one encoding VITERBI function, which is known, with general processing functions which themselves are also known).

Figure 2:
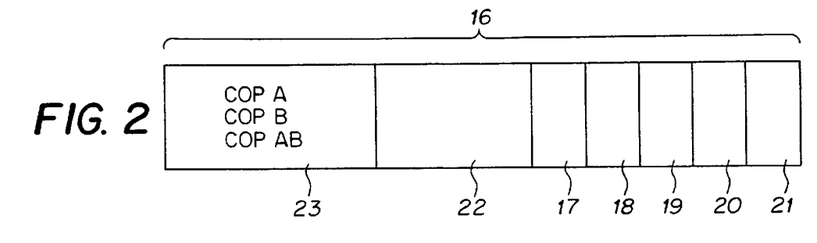
FIG. 2 shows a preferred structure of an instruction word that can be used in the device and a method of the invention.

One of the characteristics of the invention is that the processor 1 and the coprocessor 2 are connected to one and the same instruction memory 3 by a bus 4, at least some of whose wires 5 reach the coprocessor 2. As shown in FIG. 2, an instruction word in one example is encoded on 16 bits and the memory 3 has 16 outputs in parallel on the bus 4 to convey each of these 16 bits. As shall be seen further below, the bus 5 is not a 16-bit bus but a 4-bit bus only, taking 4 bits out of the 16 bits extracted from the memory 3.

The processor 1 has a standard instruction register 6 that is connected at an input to the bus 4 and at an output to an instruction decoder 7. Data elements coming from data memories X or Y are conveyed up to an input/output data register 8 of the processor 1. Programmable processor circuits 9 of the processor 1 apply programmed processing operations to the data elements stored in the register 8, these programmed processing operations having their parameters set by binary data elements stored in the instructions register 6. These operations are performed at the rate of a sequencer 10. At the end of the processing operation, the data elements are available in the input/output register 8 to be distributed to the different peripherals to which the processor 1 is connected. The architecture thus described is a quite standard architecture of a processor. The sequencer 10 notably controls the circuits 6 to 9.

One of the particular features of the invention is that the instruction decoder 7 is used to produce not only control signals used during the performance of the instruction but also a recognition signal known as VCI conveyed by a connection 11 (one or more wires) to the coprocessor 2. The signal VCI is a signal which indicates that the instruction decoded by the decoder 7 is an instruction that should be carried out by the coprocessor 2.

The coprocessor 2, like the processor 1, has an instruction register 12, an instruction decoder 13, a data input register 14, a data output register 15 and a programmable processor circuit 16. The register 12 is connected, at an input, to the bus 5, and at an output, to the decoder 13. The decoder 13 is connected, at an output, to the circuit 16. The coprocessor 2 may have a sequencer for cases when it is asked to carry out relatively complex operations stringing together several coprocessor instructions.

Preferably, the different units of the coprocessor 2 are synchronized by the sequencer 10 of the processor 1. In practice, since it is sought to make the coprocessor 2 carry out specific operations during one cycle period of the processor 1, this control task is of the most elementary type: it is just a clock rate-setting control. The processing circuit 16 is preferably a programmable but specific circuit. It is programmable in the sense that it can have its parameters set by a certain number of instructions available in the instruction register 12. For example, this number of instructions in the invention is 16. This is why it is necessary only to transmit four bits through the bus 5: $2^4$=16. While being programmable to a small extent, the processing circuit 16 can nevertheless be a very complex specific circuit physically carrying out a large number of operations with permanently fixed connections. By contrast, the processing circuit 9 of the processor 1 is far more flexible and is capable of carrying out more general operations: it can carry out about one thousand different instructions.

One last particular feature of the invention is the fact that the decoder 13, the register 12 or any of the other circuits 14 to 16 include or may include a validation input to receive the signal VCI and authorize the performance of an instruction by the processing circuit when the recognition signal has been received. FIG. 1 shows only that the instruction decoder 13 or possibly (in dashes) the instruction register 12 are validated by the signal VCI. The validation circuit may be very simple: it may quite simply have a switch (a transistor) to permit or not permit the passage of a "chip enable" type of ON signal for putting an elementary circuit into operation.

FIG. 2 gives a view, in an example using 16 bits, of the shape of an instruction word extracted from the instruction memory 3. The eleven first bits represent an instruction code, the last five bits correspond to modes of data exchange between the processor 1 or the coprocessor 2 and the data memories X or Y. Thus, the first bits 17 of these last five bits relate to the selected data memory: the memory X or the memory Y. The second bit 18 relates to the mode of processing the memory: writing or reading. The third bit 19 relates to an address indicator in this memory. There are two possible address indicators. The last two bits 20 and 21 relate, in a particular case of use, to the designation of one out of four possible increments in the data memory X or Y. Indeed, there are known ways in particular applications of carrying out addressing operations of a type such that, from one data transfer to another, the data elements that are taken or written are taken or written with preset address increments.

The eleven instruction code bits of the start of the word (even though the order presented herein is given by way of an indication and the bits could be mixed) enables the definition of more than one thousand instructions: the thousand instructions that can be used by the processor 1 and the 16 instructions that can be used by the coprocessor 2. The codes corresponding to the 16 instructions that can be used by the coprocessor 2 will always be placed in a 4-bit zone 22 of the instruction word which corresponds to four wires of the bus 5 which are connected to the register 12. In the preceding five bits, a particular configuration of these five bits will be used to indicate that the coprocessor 2 must be put into operation.

In a particular example that shall be explained further below, the coprocessor 2 is actually a slightly more complex circuit in the sense that it is possible, by extension, to say that it is divided into two coprocessors: a coprocessor A and a coprocessor B. This twofold expression is partly justified because the memories being dealt with are double data memories X and Y. It is therefore planned that, for certain instructions, the processing circuit 16 will receive, in its data input register 14, data elements coming from the data memory X or from the data memory Y. By contrast if, for certain processing operations, it is necessary to process data elements of the data memory X and data elements of the data memory Y at the same time, it proves to be necessary to double the data input register 14. This will also be true for the data output register 15 which will have to be doubled. In practice, the processing circuit 16 will be complemented by circuits (not shown) that take account, at the same time, of the data elements coming from the other memory. In the case of an instruction having this complexity, indeed a coprocessor A may process the data elements of the data memory X and a coprocessor B may process those of the data memory Y, or vice versa. Or again, a processing circuit of a single coprocessor may carry out an operation pertaining to a data element X and a data element Y that are received simultaneously.

By contrast, the instruction register 13 is, in principle, the same for both the processing circuits since only one instruction has been loaded for the given cycle. In practice, this results in necessitating the definition, in the remaining five-bit zone of the instruction word of FIG. 2, of one, two or even three different identifications: an identification COP A to state that the coprocessor A is implicated, an identification COP B to state that the coprocessor B is implicated or even an identification COP AB to state that both are implicated. In practice, these two or three identifications may be a particular form of representing the first five bits of the instruction word. A coprocessor may be selected by a dedicated code as indicated here above, or else its operation may be validated by writing a command to this effect in an internal status register of the coprocessor, in an initialization stage. In this case, each coprocessor should first of all be validated before it can function, and then invalidated. Only one coprocessor can be active at a time. The sequencer 10 can be loaded with these validations and invalidations.

The particular feature of the invention is that it produces the signal VCI in the decoder 7 from these particular forms of representation. This mode of working ultimately makes it possible to define 3×16=48 instructions that can be carried out by the coprocessor 2. The detection, in a known type of decoder 7, of these forms of representation does not raise any difficulty, so that it is easy to produce the corresponding signal or signals VCI.

The data input/output register 8, data input register 14 or data output register 15 are linked to the data memories X or Y by a data bus 24, the number of wires of this bus 24 depending on the precision required for the data elements: 16 bits or 32 bits or even more. The processor 1 also has circuits (not shown) to address the instruction memory 3 and the data memory X and Y in a standard way.

Figures 3A, 3B, 3C, 3D:
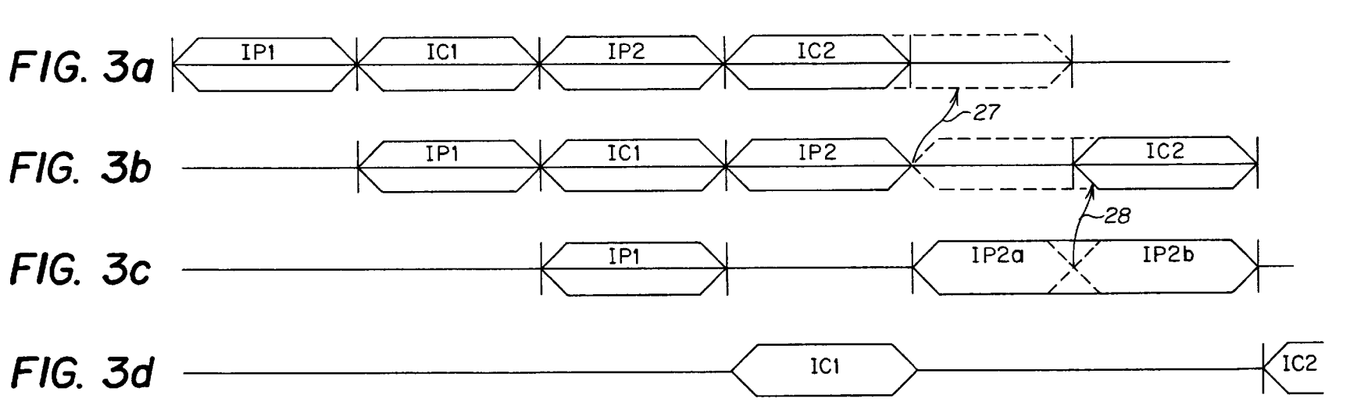
FIGS. 3a to 3e show timing diagrams of the performance of various operations by the different parts of the circuit of the invention.

FIGS. 3a to 3e enable a clearer explanation of the working of the circuit of the invention. FIG. 3a shows the operation by which the processor 1 addresses the instruction memory 3 in order to seek an instruction and in order to load the different instruction register. It shows, for example, that the processor 1 will first of all seek an instruction known as IP1 that can be performed by the processing circuit 9 of the processor 1, then an instruction IC1 that can be carried out by the processing circuit 16 of the coprocessor 2, then an instruction IP2 that can be carried out by the processor 1 and an instruction IC2 that can be carried out by the coprocessor. Continuing in this way, the sequencer 10 organizes the reading of the memory 3 of instructions in order to deliver the desired instructions on the buses 4 and 5.

FIG. 3b shows the decoding of these instructions at a subsequent working cycle, both in the instruction decoder 7 and instruction decoder 13 which are parallel connected. If the signal VCI validating a coprocessor instruction is active, the working of the decoder 13 is validated. Thus, these decoders decode instructions IP1, IC1, IP1 at the following cycles. It is noted however that the instruction IC2 is not decoded in the cycle following the one during which the instruction IP2 is read or decoded. This shall be explained further below.

Figure 3E:
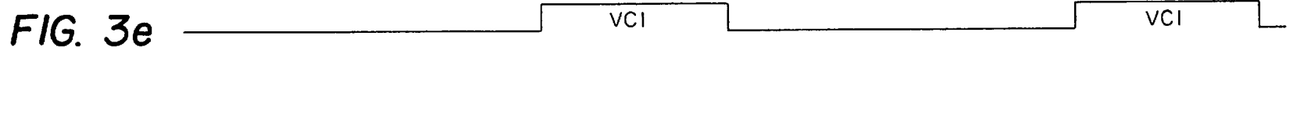

FIG. 3c shows the performance by the processor 1 of the instructions intended for it. FIG. 3d shows the performance by the coprocessor 2 of the instructions that are intended for it. FIG. 3e shows the active signal VCI at a cycle for decoding the instructions, preceding the cycle of their performance. The decoding in the decoder 7 gives rise to the decoding in the decoder 13 during one and the same cycle. Quite naturally (FIG. 3c at the third cycle shown) the processor 1 performs the instruction IP1 (the way in which the corresponding transfer of data is carried out shall be seen elsewhere). At the next cycle, an arithmetic operator of the processing circuit of the processor 1 is deactivated: it does not process the data elements. By contrast the coprocessor 2 performs the instruction IC1. The coprocessor 2 carries out the instruction IC1 because it has received or receives the signal VCI coming from the processor 1. The signal VCI is produced in the decoder 7 at the time of the decoding of the instruction IC1. The signal VCI is activated for only one cycle: the cycle that corresponds to the decoding of the coprocessor instruction and precedes its performance (which lasts one cycle in the case under consideration).

The instruction IP2 furthermore has one particular feature. Indeed, this instruction is designed at the outset to last two or even more working cycles of the processor 1. The processor 1 therefore provides for means in the decoder 7 to recognize the fact that the instruction is a two-cycle instruction: for example the tenth bit of the eleven bits of the instructions code is always at one in this case. In recognizing this situation, the decoder 7 is already capable, at the end of the decoding of the instruction IP2, of bringing about the momentary suspension, through a command 27 of the sequencer 10, of the cascaded pipe-line reading of the instruction memory (FIG. 3b). At the cycle following the decoding of the instruction IP2, this instruction is carried out by the processing circuit 9. It has a first part of an instruction IP2a and a second part to be performed at a next cycle IP2b. An operation such as this is of a known type.

With the command 27, the instruction IC2 has preferably been kept present on the buses 4 and 5. It is therefore important to permit the decoding only at the start of the last part of the instruction IP2. A command 28 will therefore be produced to this effect by the sequencer 10.

The producing of the command 28, which marks the definitive end of a multiple-cycle instruction performed by the processor 1, can be obtained in two ways. Firstly at the decoding of the instruction IP2, at the fourth period shown in FIGS. 3a to 3d, it is possible to know that the instruction being dealt with is a multiple-cycle instruction comprising two, n cycles. It is thus possible to put a up/down counter into operation with an initial countdown value of 2-1, n-1 and so on and so forth so that the up/down counter produces the appropriate command 28 at the right time.

In a preferred way, a slightly different procedure has been followed by processing the values of the instructions IP2a or IP2b loaded into the instruction register 6. It is indeed possible to filter these instructions (in a circuit that is ultimately the same as a decoder) to produce a signal when one of these instructions is shaped in a particular way. It may be decided, for example, that bits having a given weight or positional value, of the instruction code recorded in the instruction register 6, will have a determined value to indicate that the elementary instruction loaded is the last (or second-last) one. This detection can be used to produce the command 28 at the time of the loading of the elementary instruction concerned (or at the end of the execution of the preceding elementary instruction).

Preferably, the processor 1 and the coprocessor 2 are made on one and the same integrated circuit, a part of the surface of this circuit being dedicated to the processor 1 with all the circuits indicated here above and, the other part of this circuit, the size of which is greater or smaller as the case may be, being dedicated to specific processing operations. The processor 1 has a circuit 9 with very great programming complexity because of its ability to process about one thousand instructions. By contrast, the programmable circuit 16 has a far smaller programming complexity, this processing circuit 16 being capable of being complicated in itself. This complicated processing circuit 16 may be furthermore tested in each of the sixteen possible configurations corresponding to the sixteen instructions that it is liable to carry out. Acting in this way is far simpler than seeking to incorporate the sixteen instructions in the set of instructions that can be performed by the processors 1.

It has furthermore been noted that the deliberate choice of the cascaded operation as shown in FIGS. 3a to 3e and the approach consisting in permitting the work of the coprocessor 2 only during an instruction cycle very appreciably simplifies the relationship between the processors and the coprocessor and hence limits the loss of time needed to put the coprocessor 2 into operation. In practice, in the invention, the loss of time is zero. The coprocessor starts at the next cycle period. It would nevertheless be possible to consider having multiple-cycle instructions performed by the coprocessor 2 by choosing to have means, in the sequencer 10 and the decoder 7, to produce commands comparable to the commands 27 and 28 and to turn off the processor 1 this time instead of turning off the coprocessor 2.

To simplify also the function of the coprocessor 2, it is provided in the invention that the operations for extracting data elements X or Y from the memories and for loading these memories with data elements are carried out by the processor 1. This means that whichever the processing circuit, whether 9 or 16, that carries out the instruction, the management of the data bus 24 and of the data memories X or Y is left to the initiative of the processor 1. This arrangement is not complicated to design since, in any case, this is what a normal processor does. In other words, at each cycle period t, there is a reading of a t order instruction (FIG. 3a), the decoding of a t-1 order instruction (FIG. 3b), the performance in the processor 1 or in the coprocessor 2 of a t-2 order instruction (FIGS. 3c, 3d), transmission to the memories X or Y (or to the registers 8 or 14) of the data elements pertaining to the t-2 order instruction and the supply, to the memories X or Y or to the registers 8 and 15, of the data elements processed by the t-1 order instruction. All these operations are carried out in a standard way by a processor-based integrated circuit, notably the so-called ST9 microprocessor-based circuit of the present Applicant.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. An electronic circuit comprising a processor and a first coprocessor, wherein:

the processor and the first coprocessor are connected to an instruction memory by at least certain wires of a data output bus of the instruction memory, the processor comprises, in a first instruction decoder for receiving an instruction and for decoding said instruction during a cycle, a circuit for recognition, during said cycle, in said instruction, of the fact that said instruction has to be carried out by the first coprocessor and for producing and sending to the first coprocessor, during said cycle, a recognition signal corresponding to said recognition, and the first coprocessor comprises a second instruction decoder for receiving said instruction signal, and for decoding said instruction during the cycle, and a validation circuit connected to receive said recognition signal to validate the decoding of the instruction by said second instruction decoder, the validation permitting said first coprocessor to perform said instruction.

2. A circuit according to claim 1, wherein:

the electronic circuit is a monolithic integrated circuit, and wherein the first coprocessor further comprises:

an instruction register connected to the second decoder to store and enable the performance of instructions decoded by the second decoder;

a programmable processing circuit to process data elements as a function of instructions transmitted by the instruction register;

a data input register having an input connected to a data bus of the integrated circuit and an output connected to the processing circuit of the first coprocessor; and a data output register having an input connected to the processing circuit of the first coprocessor and an output connected to the data bus of the integrated circuit.

3. A circuit according to claim 2, comprising a second coprocessor parallel-connected with the coprocessor, for the simultaneous processing of data elements from two different data memories.

4. A circuit according to claim 3, wherein the processor comprises a circuit to delay the sending of the recognition signal if the processor is carrying out a multiple-cycle instruction that lasts longer than a working cycle of the processor.

5. A circuit according to claim 4, wherein the delay circuit comprises:

in the first decoder, a decoding circuit to detect a multiple-cycle instruction comprising several ordered elementary instructions, a last elementary instruction being recognizable, and a circuit to permit the transmission of the recognition signal at the end of the multiple-cycle instruction.

6. A circuit according to claim 4, wherein the delay circuit comprises:

in the first decoder, a decoding circuit to detect the fact that a multiple-cycle instruction is present, and an up/down counter for being placed in a starting condition that depends on a duration of the multiple-cycle instruction to be carried out by the processor, and for producing a signal to permit the transmission of the recognition signal at the end of the multiple-cycle instruction.

7. A circuit according to claim 2, wherein the processor comprises a circuit to delay the sending of the recognition signal if the processor is carrying out a multiple-cycle instruction that lasts longer than a working cycle of the processor.

8. A circuit according to claim 7, wherein the delay circuit comprises:

in the first decoder, a decoding circuit to detect a multiple-cycle instruction comprising several ordered elementary instructions, a last elementary instruction being recognizable, and a circuit to permit the transmission of the recognition signal at the end of the multiple-cycle instruction.

9. A circuit according to claim 7, wherein the delay circuit comprises:

in the first decoder, a decoding circuit to detect the fact that a multiple-cycle instruction is present, and an up/down counter for being placed in a starting condition that depends on a duration of the multiple-cycle instruction to be carried out by the processor, and for producing a signal to permit the transmission of the recognition signal at the end of the multiple-cycle instruction.

10. A circuit according to claim 1, comprising a second coprocessor parallel-connected with the first coprocessor, for the simultaneous processing of data elements from two different data memories.

11. A circuit according to claim 10, wherein the processor comprises a circuit to delay the sending of the recognition signal if the processor is carrying out a multiple-cycle instruction that lasts longer than a working cycle of the processor.

12. A circuit according to claim 11, wherein the delay circuit comprises:

in the first decoder, a decoding circuit to detect a multiple-cycle instruction comprising several ordered elementary instructions, a last elementary instruction being recognizable, and a circuit to permit the transmission of the recognition signal at the end of the multiple-cycle instruction.

13. A circuit according to claim 11, wherein the delay circuit comprises:

in the first decoder, a decoding circuit to detect the fact that a multiple-cycle instruction is present, and an up/down counter for being placed in a starting condition that depends on a duration of the multiple-cycle instruction to be carried out by the processor, and for producing a signal to permit the transmission of the recognition signal at the end of the multiple-cycle instruction.

14. A circuit according to claim 1, wherein the processor comprises a circuit to delay the sending of the recognition signal if the processor is carrying out a multiple-cycle instruction that lasts longer than a working cycle of the processor.

15. A circuit according to claim 14, wherein the delay circuit comprises:

in the first decoder, a decoding circuit to detect a multiple-cycle instruction comprising several ordered elementary instructions, a last elementary instruction being recognizable, and a circuit to permit the transmission of the recognition signal at the end of the multiple-cycle instruction.

16. A circuit according to claim 14, wherein the delay circuit comprises:

in the first decoder, a decoding circuit to detect the fact that a multiple-cycle instruction is present, and an up/down counter for being placed in a starting condition that depends on a duration of the multiple-cycle instruction to be carried out by the processor, and for producing a signal to permit the transmission of the recognition signal at the end of the multiple-cycle instruction.

17. A method for the use of a processor and a coprocessor, wherein said method comprises the following steps:

sending at least one same part of an instruction signal simultaneously to the processor and the coprocessor by at least certain wires of an output bus of a memory of instructions, decoding the instruction signal in the processor during a cycle and producing a recognition signal therein, during the cycle, corresponding to the fact that a decoded instruction has to be carried out by the coprocessor, and decoding the instruction signal in the coprocessor during the cycle to allow the coprocessor, when it receives the recognition signal, to execute the instruction during a following cycle.

18. A method according to claim 17, wherein a sequencer of the processor is made to send synchronized commands to an instruction decoder of the coprocessor, an instruction register of the coprocessor, programmable processing circuits of the coprocessor, a data input register of the coprocessor, and a data output register of the coprocessor.

19. A method according to claim 18, wherein the processor is made to manage points of access to memory that are necessary for the working of the coprocessor.

20. A method according to claim 17, wherein the processor is made to manage points of access to memory that are necessary for the working of the coprocessor.

21. An electronic circuit including a processor and a first coprocessor, the electronic circuit comprising:

an instruction bus operatively connected between an instruction memory, the processor, and the first coprocessor, a first instruction decoder in the processor and operatively connected to the instruction bus and operative to receive an instruction from the memory and to decode the instruction during a cycle and to produce, during the cycle, a recognition signal output, and a second instruction decoder in the first coprocessor operatively connected to the instruction memory and operative to receive an instruction from the memory and to decode the instruction during the cycle and to receive the recognition output, wherein the recognition signal output signifies that the instruction is to be executed by the first coprocessor.

22. A circuit according to claim 21, wherein:

the electronic circuit is comprised in a monolithic integrated circuit, and wherein the electronic circuit further comprises, in the first coprocessor:

an instruction register operatively connected to the second decoder;

a programmable processing circuit operatively connected to to the instruction register;

a data input register having an input connected to a data bus of the integrated circuit and an output operatively connected to the processing circuit of the first coprocessor; and a data output register having an input connected to the processing circuit of the first coprocessor and an output operatively connected to the data bus of the integrated circuit.

23. A circuit according to claim 22, wherein a second coprocessor is operatively parallel-connected with the first coprocessor, the first coprocessor being operatively connected to a first data memory and the second coprocessor being operatively connected to a second data memory.

24. A circuit according to claim 23, further comprising a delay circuit in the first decoder, for delaying a recognition signal on the recognition signal output, upon detection of a multiple-cycle instruction that lasts longer than a working cycle of the processor.

25. A circuit according to claim 24, wherein the delay circuit comprises:

in the first decoder, a decoding circuit to detect a multiple-cycle instruction comprising several ordered elementary instructions, a last elementary instruction being recognizable, and a circuit operatively connected to the decoding circuit, to permit the transmission of the recognition signal upon detection of the last elementary instruction.

26. A circuit according to claim 24, wherein the delay circuit comprises:

in the first decoder, a decoding circuit to detect the presence of a multiple-cycle instruction, and an up/down counter for being placed in a starting condition that depends on a duration of the multiple-cycle instruction to be carried out by the processor, and for producing a signal to permit the transmission of the recognition signal at the end of the multiple-cycle instruction.

27. A circuit according to claim 22, further comprising a delay circuit in the first decoder, for delaying a recognition signal on the recognition signal output upon detection of a multiple-cycle instruction that lasts longer than a working cycle of the processor.

28. A circuit according to claim 27, wherein the delay circuit comprises:

in the first decoder, a decoding circuit to detect a multiple-cycle instruction comprising several ordered elementary instructions, a last elementary instruction being recognizable, and a circuit operatively connected to the decoding circuit, to permit the transmission of the recognition signal upon detection of the last elementary instruction.

29. A circuit according to claim 27, wherein the delay circuit comprises:

in the first decoder, a decoding circuit to detect the presence of a multiple-cycle instruction, and an up/down counter for being placed in a starting condition that depends on a duration of the multiple-cycle instruction to be carried out by the processor, and for producing a signal to permit the transmission of the recognition signal at the end of the multiple-cycle instruction.

30. A circuit according to claim 21, wherein a second coprocessor is operatively parallel-connected with the first coprocessor, the first coprocessor being operatively connected to a first data memory and the second coprocessor being operatively connected to a second data memory.

31. A circuit according to claim 30, further comprising a delay circuit in the first decoder, for delaying the recognition signal on the recognition signal output upon detection of a multiple-cycle instruction that lasts longer than a working cycle of the processor.

32. A circuit according to claim 31, wherein the delay circuit comprises:

in the first decoder, a decoding circuit to detect a multiple-cycle instruction comprising several ordered elementary instructions, a last elementary instruction being recognizable, and a circuit operatively connected to the decoding circuit, to permit the transmission of the recognition signal upon detection of the last elementary instruction.

33. A circuit according to claim 31, wherein the delay circuit comprises:

in the first decoder, a decoding circuit to detect the presence of a multiple-cycle instruction, and an up/down counter for being placed in a starting condition that depends on a duration of the multiple-cycle instruction to be carried out by the processor, and for producing a signal to permit the transmission of the recognition signal at the end of the multiple-cycle instruction.

34. A circuit according to claim 21, further comprising a delay circuit in the first decoder, for delaying the recognition signal on the recognition signal output upon detection of a multiple-cycle instruction that lasts longer than a working cycle of the processor.

35. A circuit according to claim 34, wherein the delay circuit comprises:

in the first decoder, a decoding circuit to detect a multiple-cycle instruction comprising several ordered elementary instructions, a last elementary instruction being recognizable, and a circuit operatively connected to the decoding circuit, to permit the transmission of the recognition signal upon detection of the last elementary instruction.

36. A circuit according to claim 34, wherein the delay circuit comprises:

in the first decoder, a decoding circuit to detect the presence of a multiple-cycle instruction, and an up/down counter for being placed in a starting condition that depends on a duration of the multiple-cycle instruction to be carried out by the processor, and for producing a signal to permit the transmission of the recognition signal at the end of the multiple-cycle instruction.

37. A method of using a processor and a coprocessor, comprising the steps of:

sending at least one part of an instruction signal simultaneously to a processor and a coprocessor, determining during a cycle whether to produce a recognition signal by the processor based on the instruction signal, decoding the at least one part of the instruction signal in both the processor and the coprocessor during the cycle, and allowing the coprocessor to carry out operations corresponding to the at least one part of the instruction signal in response to the recognition signal.

38. A method according to claim 37, further including the step of delaying the recognition signal upon detection of a multiple-cycle instruction.

39. A method according to claim 38, wherein the delaying step comprises the step of recognizing a last elementary instruction in the multiple-cycle instruction.

40. A method according to claim 38, wherein the delaying step comprises determining a duration of the multiple-cycle instruction using a counter.

41. A method according to claim 37, further including the step of sending, by a sequencer of the processor, synchronized commands to an instruction decoder of the coprocessor, an instruction register of the coprocessor, programmable processing circuits of the coprocessor, a data input register of the coprocessor, and a data output register of the coprocessor.

42. A method according to claim 37, further including the step of managing, by the processor, points of access to memory that are necessary for the working of the coprocessor.

43. A method according to claim 37, wherein the step of decoding simultaneously decodes the at least one part of an instruction in both the processor and the coprocessor.

44. A method according to claim 37, further including the step of preventing the coprocessor from carrying out the at least one part of the instruction in the absence of the recognition signal.

45. A method according to claim 37, further including the steps of:

simultaneously decoding the at least one part of an instruction in both the processor and the coprocessor, preventing the coprocessor from carrying out the at least one part of the instruction in the absence of the recognition signal, and delaying the recognition signal upon detection of a multiple-cycle instruction.

46. A method according to claim 45, wherein the delaying step comprises the step of recognizing a last elementary instruction in the multiple-cycle instruction.

47. A method according to claim 45, wherein the delaying step comprises determining a duration of the multiple-cycle instruction using a counter.

48. A method according to claim 45, further including the step of sending, by a sequencer of the processor, synchronized commands to an instruction decoder of the coprocessor, an instruction register of the coprocessor, programmable processing circuits of the coprocessor, a data input register of the coprocessor, and a data output register of the coprocessor.

49. A method according to claim 45, further including the step of managing, by the processor, points of access to memory that are necessary for the working of the coprocessor.

50. A circuit for use with a processor and a coprocessor, comprising:

means for simultaneously providing at least one part of an instruction signal from an instruction memory to both a processor and a coprocessor, wherein the instruction signal encodes whether an instruction is to be carried out by the processor or the coprocessor, recognizing means, responsive to the means for providing, for determining during a cycle, based on the instruction signal, that the processor is to produce a recognition signal that signifies that the instruction is to be carried out by the coprocessor, means for decoding the at least one part of an instruction signal in both the processor and the coprocessor during the cycle, and means responsive to the recognizing means for allowing the coprocessor to carry out operations corresponding to the at least one part of the instruction signal in response to the recognition signal.

51. A circuit according to claim 50, further including sequencer means in the processor, for sending synchronized commands to an instruction decoder of the coprocessor, an instruction register of the coprocessor, programmable processing circuits of the coprocessor, a data input register of the coprocessor, and a data output register of the coprocessor.

52. A circuit according to claim 50, further including means in the processor, for managing points of access to memory that are necessary for the working of the coprocessor.

53. A circuit according to claim 50, further including means for delaying the recognition signal upon detection of a multiple-cycle instruction.

54. A circuit according to claim 53, wherein the means for delaying includes means for recognizing a last elementary instruction in the multiple-cycle instruction.

55. A circuit according to claim 53, wherein the means for delaying includes counting means for determining a duration of the multiple-cycle instruction.

56. A circuit according to claim 50, wherein the means for simultaneously decoding is for decoding the at least one part of an instruction in both the processor and the coprocessor.

57. A circuit according to claim 50, further including means responsive to the recognizing means, for preventing the coprocessor from carrying out the at least one part of the instruction in the absence of the recognition signal.

58. A circuit according to claim 50, further including:

means responsive to the recognizing means, for preventing the coprocessor from carrying out the at least one part of the instruction in the absence of the recognition signal, means for simultaneously decoding the at least one part of an instruction in both the processor and the coprocessor, and means for delaying the recognition signal upon detection of a multiple-cycle instruction.

59. A circuit according to claim 58, wherein the means for delaying includes means for recognizing a last elementary instruction in the multiple-cycle instruction.

60. A circuit according to claim 58, wherein the means for delaying includes counting means for determining a duration of the multiple-cycle instruction.

61. A circuit according to claim 58, further including sequencer means in the processor, for sending synchronized commands to an instruction decoder of the coprocessor, an instruction register of the coprocessor, programmable processing circuits of the coprocessor, a data input register of the coprocessor, and a data output register of the coprocessor.

62. A circuit according to claim 58, further including means in the processor, for managing points of access to memory that are necessary for the working of the coprocessor.

* * * * *

UNITED STATES PATENT AND TRADEMARK OFFICE
CERTIFICATE OF CORRECTION

PATENT NO. : 6,003,124
DATED : December 14, 1999
INVENTOR(S) : Jean-Marie Laborie It is certified that error appears in the above-identified patent and that said Letters Patent is hereby corrected as shown below:

On the title page, item [73] should read as follows:

[73]  Assignee: SGS-Thomson Microelectronics S.A., Saint Genis, France

In column 5, line 55 should read as follows:
By contrast, the instruction register 12 is, in principle, the In claim 22, column 11, line 32 should read as follows:
nected to the instruction register Signed and Sealed this Eleventh Day of July, 2000

Attest:

Q. TODD DICKINSON

*Attesting Officer*  *Director of Patents and Trademarks*